US008661128B2

(12) United States Patent
Agetsuma et al.

(10) Patent No.: US 8,661,128 B2
(45) Date of Patent: Feb. 25, 2014

(54) SERVER MACHINE AND NETWORK PROCESSING METHOD

(75) Inventors: Masakuni Agetsuma, Yokohama (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1014 days.

(21) Appl. No.: 12/050,282

(22) Filed: Mar. 18, 2008

(65) Prior Publication Data

US 2009/0190590 A1    Jul. 30, 2009

(30) Foreign Application Priority Data

Jan. 29, 2008 (JP) .................................. 2008-018205

(51) Int. Cl.
*G06F 15/173* (2006.01)

(52) U.S. Cl.
USPC .......................................... 709/226; 709/203

(58) Field of Classification Search
USPC ................................................. 709/203, 226
See application file for complete search history.

(56) References Cited

U.S. PATENT DOCUMENTS

| | | | | |
|---|---|---|---|---|
| 6,247,057 | B1 * | 6/2001 | Barrera, III | 709/229 |
| 6,661,799 | B1 * | 12/2003 | Molitor | 370/401 |
| 6,891,837 | B1 * | 5/2005 | Hipp et al. | 370/397 |
| 7,415,709 | B2 * | 8/2008 | Hipp et al. | 718/104 |
| 7,430,611 | B2 * | 9/2008 | Aiken et al. | 709/238 |
| 7,551,614 | B2 * | 6/2009 | Teisberg et al. | 370/389 |
| 7,673,012 | B2 * | 3/2010 | Nakano et al. | 709/217 |
| 7,904,513 | B2 * | 3/2011 | Kanda et al. | 709/204 |
| 2002/0035639 | A1 * | 3/2002 | Xu | 709/238 |
| 2002/0124089 | A1 * | 9/2002 | Aiken et al. | 709/227 |
| 2003/0018927 | A1 * | 1/2003 | Gadir et al. | 714/4 |
| 2004/0143608 | A1 | 7/2004 | Nakano et al. | |
| 2006/0206747 | A1 | 9/2006 | Nakano et al. | |
| 2006/0209830 | A1 * | 9/2006 | Oguchi et al. | 370/392 |
| 2007/0129015 | A1 * | 6/2007 | Iwamoto et al. | 455/41.2 |
| 2008/0025297 | A1 * | 1/2008 | Kashyap | 370/389 |

OTHER PUBLICATIONS

"Virtualization Overview" http://www.vmware.com/pdf/virtualization.pdf.
"Understanding Full Virtualization, Paravirtualization, and Hardware Assist", http://www.vmware.com/files/pdf/VMware_paravirtualization.pdf.
"Virtualization: Architectural Considerations and Other Evaluation Criteria", http://www.vmware.com/pdf/virtualization_considerations.pdf.
W. Richard Stevens, "UNIX Network Programming", pp. 278-289 Prentice Hall PTR, 1990.

* cited by examiner

*Primary Examiner* — Duyen Doan
(74) *Attorney, Agent, or Firm* — Antonelli, Terry, Stout & Kraus, LLP.

(57) ABSTRACT

An object of the present invention is to provide a server machine and network processing method capable of running a plurality of same server applications at a time on a single OS in a single sever machine.

A server machine comprises a packet dispatching processor for retrieving a destination application group of a communication packet based on first identification information included in a communication packet received by any of a plurality of ports and first management information; for retrieving a plurality of endpoints based on second identification information included in the communication packet and second management information; and for dispatching the communication packet to a server application corresponding to any of the plurality of the retrieved endpoints and belonging to the retrieved application group.

6 Claims, 15 Drawing Sheets

FIG.3

PROCESS MANAGEMENT TABLE 109

| PID (1090) | VNAS-ID (1091) | ... (1092) |
|---|---|---|
| 1000 | VNAS1 | ... |
| 2000 | VNAS2 | ... |
| 3000 | VNAS3 | ... |
| ⋮ | ⋮ | ⋮ |

FIG.5

ANY ADDRESS MANAGEMENT TABLE 110

| IP ADDRESS (1100) | VNAS-ID (1101) | NETWORK INTERFACE (1102) |
|---|---|---|
| IP1 | VNAS1 | eth1 |
| IP2 | VNAS1 | eth2 |
| IP3 | VNAS2 | eth3 |
| IP4 | VNAS3 | eth4 |
| ⋮ | ⋮ | ⋮ |

INFO1 → row 1
INFO2 → row 2
INFO3 → row 3
INFO4 → row 4

ROUTING TABLE 112

| NETWORK ADDRESS | NETWORK INTERFACE |
|---|---|
| 192.168.10.0 | eth1 |
| 192.168.1.0 | eth2 |
| defalt | eth0 |

SERVER MACHINE AND NETWORK PROCESSING METHOD

CROSS-REFERENCE TO RELATED APPLICATIONS

This application relates to and claims priority from Japanese Patent Application No. 2008-18205, filed on Jan. 29, 2008, the entire disclosure of which is incorporated herein by reference.

BACKGROUND

1. Field of the Invention

The invention relates generally to network processing in an operating system (hereinafter referred to as "OS") and is a technique applicable to server applications such as a WEB server and file server, and to consolidation of NAS (Network Attached Storage).

2. Description of Related Art

In order to consolidate the operation management of a server machine and to reduce management costs, consolidation is suggested, in which the same kinds of services provided by each server application in a plurality of server machines are consolidated in a single server machine. The service indicates, for example, a WEB service or NFS service, and enables to utilize software features via a network.

Usually, a server application in each server machine uses a particular address called an ANY address as an address for expecting a request issued by a client. The ANY address is a technique capable of expecting all requests sent to IP addresses held in the server machine (for example, see W. Richard Stevens, UNIX Network Programming, p.p. 278-289 Prentice Hall PTR, 1990).

When each server machine consolidates server applications (hereinafter referred to as "same server applications") providing the same kinds of services, a plurality of the same server applications cannot be simply run on a single server machine.

If a plurality of the same server applications simply runs on a single server machine, it means that the server machine has a plurality of server applications with ANY addresses for expecting requests, and the server machine cannot determine which server application the requests should be received at.

For example, the following method for consolidation is suggested. First, a method using virtual machine software is suggested. The virtual machine software is capable of providing a plurality of virtual machines on a single server machine. An independent OS can run in each virtual machine. Consolidation can be achieved by providing one virtual machine for each consolidation source sever machine, and running the same kinds of server application on each virtual machine (see: (a) http://www.vmware.com/pdf/virtualization.pdf; (b) http://www.vmware.com/files/pdf/VMware_paravirtualization.pdf; and (c) http://www.vmware.com/pdf/virtualization_considerations.pdf).

In another method, consolidation is achieved in a single server application on a single server machine by integrating configuration information on the service provided in a plurality of server machines. For example, when each server machine individually manages user information on services, user information is integrated beforehand.

SUMMARY

Accordingly, in order to achieve consolidation, a plurality of the same applications cannot be simply run on a single server machine, so there is no choice but to employ either a method using a virtual machine as described above, or a method of integrating configuration information on the service into a single application.

It is an object of the present invention to provide a server machine and network processing method capable of running a plurality of same server applications at a time on a single OS in a single sever machine, without employing a method using a virtual machine in which memory usage in the server machine and the CPU load are large, or a method of integrating configuration information on the service into a single application.

According to an aspect of the invention, a server machine connected to one or more client computers via a network, comprises a plurality of ports; a plurality of application groups to which a plurality of server applications providing services belong; first management information associating the application group with first identification information used by a server application belonging to the application group; second management information associating second identification information identifying the plurality of ports with a plurality of endpoints consisting of a set of the first identification information and the second identification information; and a packet dispatching processor for retrieving a destination application group of a communication packet based on first identification information included in the communication packet received by any of the plurality of ports and the first management information; for retrieving a plurality of endpoints based on second identification information included in the communication packet and the second management information; and for dispatching the communication packet to a server application corresponding to any of the plurality of the retrieved endpoints and belonging to the retrieved application group.

Accordingly, a communication packet can be dispatched to a designated server application even when a server machine has a plurality of same server applications. Thus, the server machine in the invention can run a plurality of same server applications at a time on a single OS.

According to another aspect of the invention, a network processing method for a server machine connected to one or more client computers via a network, comprises a first association step for associating a plurality of application groups to which a plurality of server applications providing services belong with first identification information that can be used by a server application belonging to the application group, as first management information; a second association step for associating second identification information identifying the plurality of ports with a plurality of endpoints consisting of a set of the first identification information and the second identification information, as second management information; and a packet dispatching processing step for retrieving a destination application group of a communication packet based on first identification information included in the communication packet received by any of the plurality of ports and the first management information; for retrieving a plurality of endpoints based on second identification information included in the communication packet and the second management information; and for dispatching the communication packet to a server application corresponding to any of the plurality of the retrieved endpoints and belonging to the retrieved application group.

Consequently, a communication packet can be dispatched to a designated server application even when a server machine has a plurality of same server applications. Thus, the server machine in the invention can run a plurality of the same server applications at a time on a single OS.

According to the present invention, it is possible to run a plurality of same server applications, which expect requests by using an ANY address, on a single OS in a single server machine at a time.

Also, a single server machine is capable of dispatching requests from a client and dispatching the requests without fail even when there is a plurality of same server applications.

The same services operated on a plurality of server machines can be consolidated onto a single server machine without modifying an existing server application, and the single server machine can be used as a server consolidation.

Other aspects and advantages of the invention will be apparent from the following description and the appended claims.

BRIEF DESCRIPTION OF THE DRAWINGS

FIG. 3 is an explanatory diagram explaining a process management table.

FIG. 5 is an explanatory diagram explaining an ANY address management table.

DETAILED DESCRIPTION OF PREFERRED EMBODIMENTS

An embodiment of the present invention will be described below with reference to the attached drawings.

(1) Computer System Configuration

Figure 1:
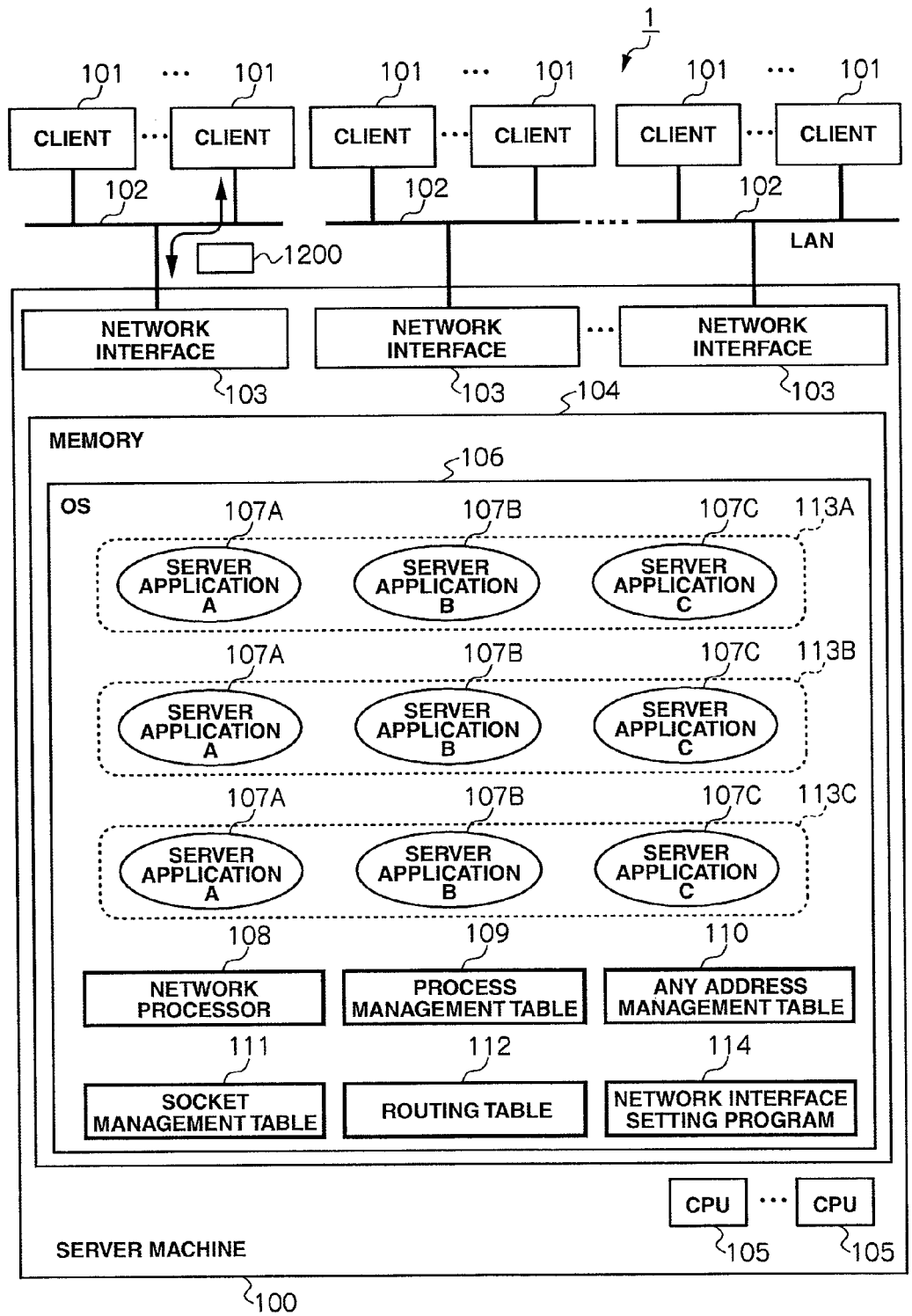
FIG. 1 is a block diagram showing the configuration of a computer system according to an embodiment of the invention.

"1" shown in FIG. 1 represents a computer system 1 according to a first embodiment. The computer system 1 is configured so that a server machine 100 is connected via LAN 102 to a plurality of client computers 101 (hereinafter simply referred to as "clients").

The client 101 is a computer accessing services provided by a server application 107 in a server machine 100.

The server machine 100 mainly consists of a network interface 103, a CPU 105 and memory 104.

The server machine 100 may have more than one network interface 103, CPU 105 and memory 104, respectively.

The network interface 103 is connected to the LAN 102, and is an interface for communicating with the client 101 by using a network protocol such as TCP (Transmission Control Protocol) or UDP (User Datagram Protocol).

The memory 101 is, for example, semiconductor memory, and stores data to which the CPU 105 and the program executed by the CPU 105 refers. More specifically, the memory 104 stores server applications 107A-107C in an operating system (mentioned as an "OS" in drawings) 106, a network processing unit 108 which is a program, a process management table 109, an ANY address management table 110, a socket management table 111, a routing table 112, and a network interface setting program 114 which makes requests to the OS 106 to set and delete network interface IP addresses.

The CPU 105 is a processor for controlling the actions of the server machine 100. The CPU 105 executes programs such as the server applications 107A-107C on the OS 106 or the network processing unit 108 that are stored in the memory 104.

The server applications 107A-107C are applications for providing the client 101 with services related to files, web, email and ftp. The server applications 107A-107C may be applications in a user space within the OS 106, or may be applications in a kernel space within the OS. Furthermore, the number of applications is not limited.

In the first embodiment, plural server applications, of three server applications including 107A, 107B and 107C, which provide the services, run.

The OS 106 groups a process family by adding identification numbers called VNAS (Virtual NAS)-IDs to all processes including the server application 107. Here, a process means programs including the server application that are being executed by the server machine 100. In FIG. 1, three VNAS sets 113A, 113B and 113C are formed, where one VNAS set consists of three server applications 107A, 107B and 107C that provide different types of services. The VNAS113 groups different-type sever applications into one group, and more than one VNAS113 exists in the single OS 106. Also, the VNAS113A, 113B and 113C are process families that are supposed to be provided by each of three server machines. Incidentally, the process configurations of each group do not necessarily match one another. Furthermore, they are respectively described as the server application 107 and VNAS113, unless expressly indicated otherwise.

A request from the client 101 is included in a communication packet (hereinafter simply referred to as the "packet") 1200 and sent to the server machine 100. When the request arrives at the network interface 103 in the server machine 100 via the LAN 102, the network processing unit 108 in the OS 106 determines which of destination server applications 107A-107C in a plurality of the VNAS113 the request is addressed to, based on information in various management tables 109-111.

(2) Network Processing Unit

Figure 2:
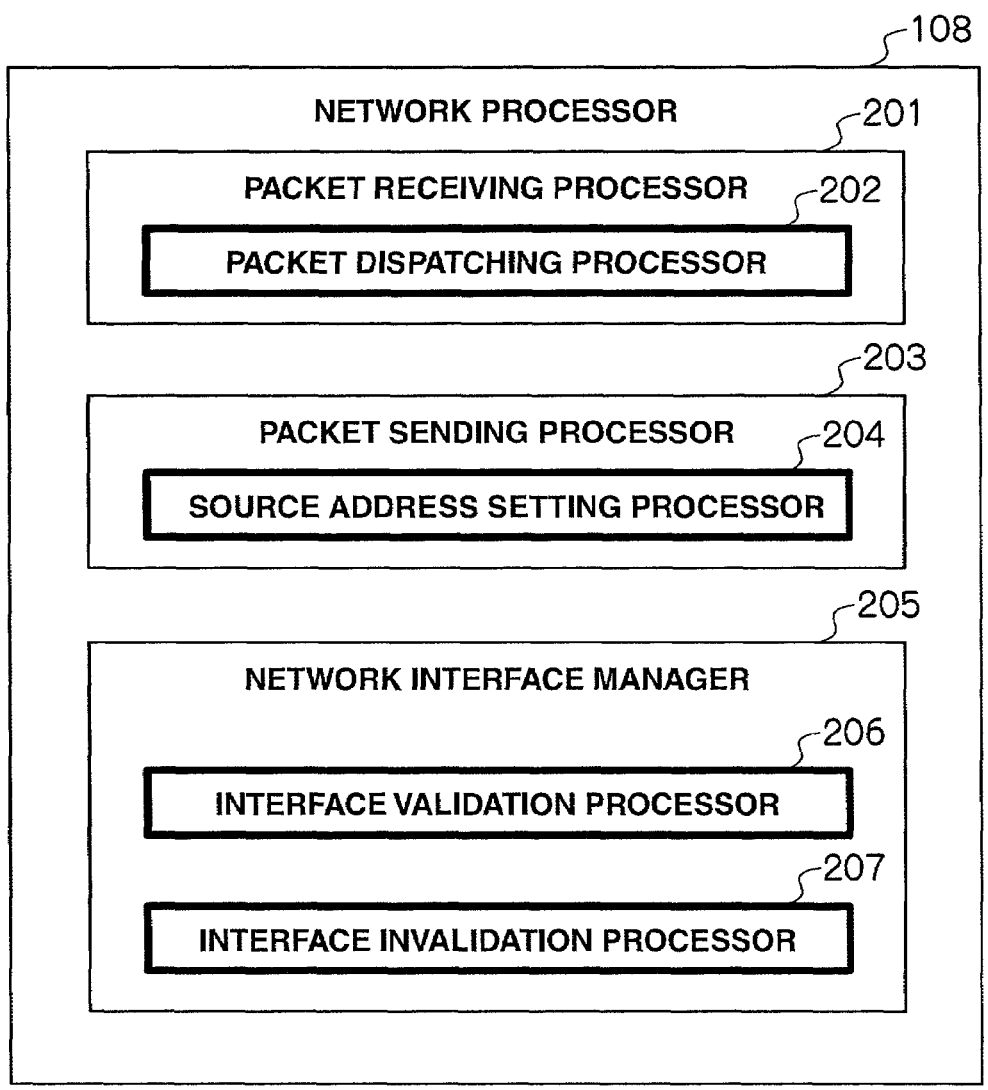
FIG. 2 is a block diagram showing the internal configuration of a network processing unit.

The configuration diagram of the network processing unit 108 is shown in FIG. 2.

The network processing unit 108 is a program for sending and receiving a packet 1200, and for managing the network interface 103. The network processing unit 108 includes a packet receiving processor 201, a packet sending processor 203 and a network interface manager 205.

The packet receiving processor 201 executes processing for delivering the packet 1200 of the request received from the client 101 via the network interface 103 to server applications 107A-107C. The packet receiving processor 201 includes a packet dispatching processor 202.

The packet dispatching processor 202 determines which type of server application 107A-107C the packet 1200 should be delivered to; and when there is more than one same-type server application 107, the packet dispatching processor 202 determines which of the same server applications 107 in the VNAS113A-113C the packet 1200 should be delivered to. The packet dispatching processor 202 will be explained in a flowchart described later below.

The packet sending processor 203 executes processing for sending the packet 1200 to the client 101 via the network interface 103 based on a packet sending request from the server application 107. The packet sending processor 203 includes a source address setting processor 204.

The source address setting processor 204 executes processing for setting an IP address (a first identification) available to the server application 107 that issued the packet-sending request as a source address of the packet. The source address setting processor 204 will be explained in a flowchart described later below.

The network interface manager 205 executes processing for assigning IP addresses and enabling the network interface 103 (hereinafter referred to as "validation"); and executes processing for deleting the IP address and disabling the network interface 103 (hereinafter referred to as "invalidation").

Also, the network interface manager 205 executes processing for registering and deleting values in the ANY address management table 110 as well as the validation and invalidation of the network interface 103. The network interface manager 205 includes an interface validation processor 206 and interface invalidation processor 207. The interface validation processor 206 and interface invalidation processor 207 will be explained in a flowchart described later below.

(3) Process Management Table

FIG. 3 is an explanatory diagram for explaining a process management table 109.

The process management table 109 is a table for managing all process information on the OS 106 including the process of the server application 107.

The process management table 109 mainly includes a "PID" column 1090 for a process identification number uniquely added to each process in the order it runs; and a "VNAS-ID" column 1091 for the identification number of the VNAS113 to which the process belongs. Management information such as that concerning resources used by processes is stored in another column 1092.

The VNAS113 identification number is used for distinguishing the IP addresses available for each process. When the server machine 100 runs more than one same server application 107 expecting a request by using an ANY address, a process is generated beforehand with a different VNAS113 identification number so that each server application 107 can expect a request with a different IP address.

Figure 4:
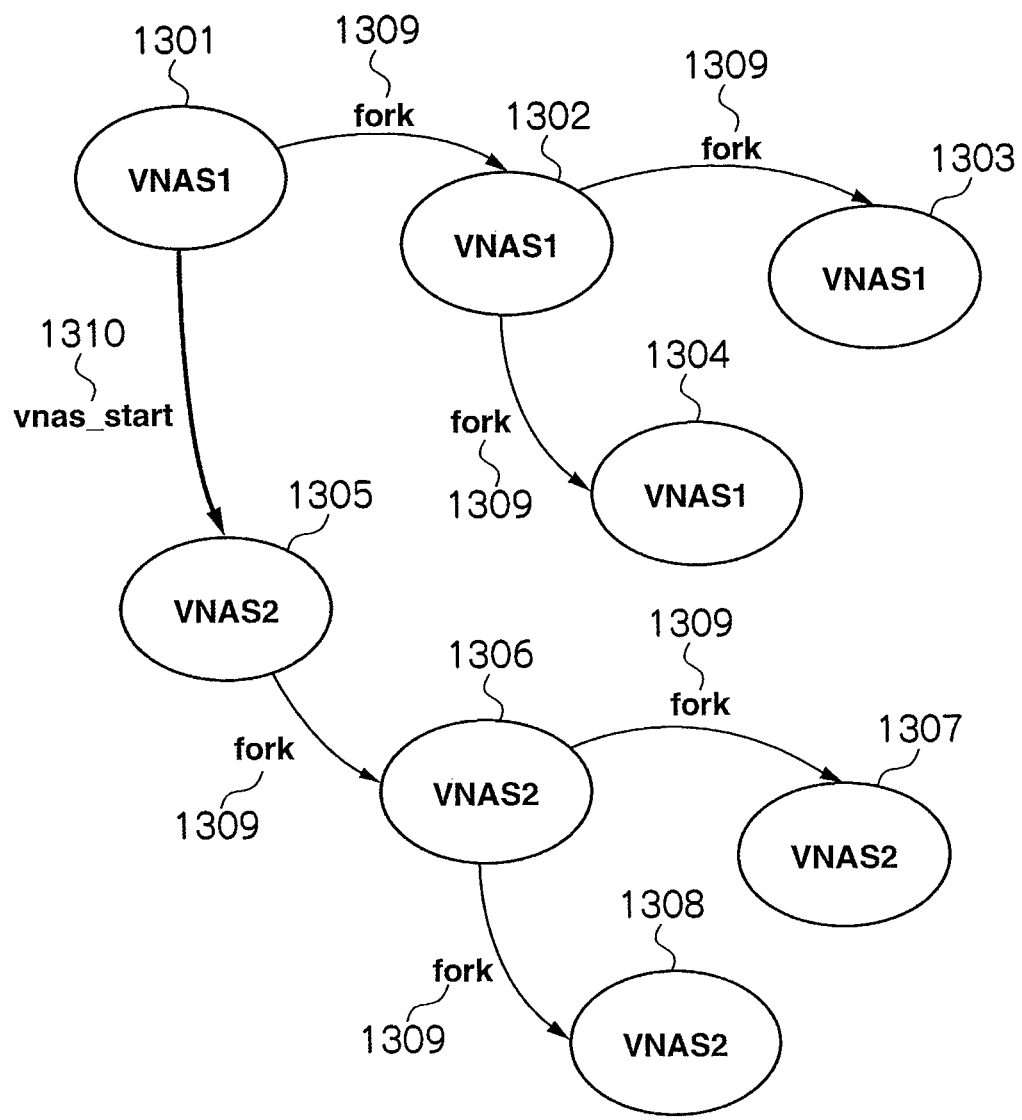
FIG. 4 is a concept diagram explaining the correspondence between process generations and VNAS identification numbers.

Here, an example of grouping a process family into a VNAS113 group will be described. A pattern diagram of a process tree (a tree structure showing the parentage between processes) according to the first embodiment is shown in FIG. 4.

1301-1308 each show processes. Also, VNAS113 IDs are assigned to the respective processes 1301-1308.

The following will be described in the situation where the ID, for example, VNAS1 is assigned to the process 1301. The copy source process 1301 of the new process 1302 can be generated by calling a fork system call 1309. In that case, the copy source process 1301 is called a "parent process" and the newly generated process 1302 is called a "child process." When continuing to generate the new processes 1303, 1304, the copy source process 1302 calls the fork system call 1309. In that case, the copy source process 1302 is called a "parent process" and the newly generated processes 1303,1304 are called "child processes." Thus, when generating the child process from the parent process by using the fork system call 1309, the OS 106 adds the assigned VNAS113 ID to the parent process.

Meanwhile, when generating the child process from the parent process by using a vnas_start system call 1310 provided in the first embodiment, it is possible to designate the VNAS113 identification number assigned to the child process. For example, if the process 1301 to which the ID, VNAS1 assigned is called the vnas_start system call 1310, and one of the VNAS113 IDs is designated, then a new process 1305 to which the designated ID (VNAS 2) is assigned is generated. In that case, the copy source process 1301 is called a "parent process" and the newly generated process 1305 is called a "child process."

Following the above, the process 1305 generates the process 1306 by using the fork system call 1309, and the process 1306 generates the processes 1307, 1308 by using the fork system call 1309, in the same manner as that in the above described process generation.

The process families 1301-1308 are grouped into a process family having the same VNAS113 ID. The process groups grouped in that manner are groups 113A-113C. For example, the process 1303 belonging to the VNAS 1 and the process 1307 belonging to the VNAS2 correspond to the same server application 107A, and the process 1304 belonging to the VNAS 1 and the process 1308 belonging to the VNAS2 correspond to the same server application 107B.

In the first embodiment, the fork system call 1309 was explained with example as a process generating method for the OS 106, however, any API (Application Programming Interface) may be used, if it is intended for use in generating a process. Also, in the present embodiment, the vnas_start system call 1310 was used when adding an ID different from the ID of the VNAS113 to which the parent process belongs, however, the system call 1310 which is different from the vnas_start system call may be used as long as the child process can be generated by adding an ID different from the ID of the VNAS113 to which the parent process belongs.

(4) ANY Address Management Table

FIG. 5 is an explanatory diagram for explaining an ANY address management table 110.

The ANY address management table 110 is a table for managing the correspondence relationship of the VNAS113 and IP addresses. The ANY address management table 110 includes an "IP address" column 1100, a "VNAS-ID" column 1101, and a "network interface" column 1102.

Information stored in respective columns 1100, 1101, 1102 are called "ANY address management information INFO1-INFO4."

For example, FIG. 5 shows that IP1 and IP2 are available in the VNAS1, and IP3 is available in the VNAS2. It also shows that IP1 is set for eth1, IP2 is set for eth2, and IP3 is set for eth3.

Incidentally, the interface recorded on the network interface 1102 is not limited to a physical interface. The interface recorded on the network interface 1102 may be a virtual interface created in the OS 106. Specifically, it may be an interface bonding more than one physical interface, an interface duplicated using a VLAN (Virtual LAN) identification number, or an interface duplicated as software in order to assign a different IP address (alias) to the same physical/virtual interface.

Furthermore, in the first embodiment, ANY address management information is held in the ANY address management table 110 format; however, the format may be a list structure instead of a table structure. Specifically, when ANY address management information INFO is considered as one data structure, the list structure may be connected to a plurality of data structures. Also, more than one table structure or list structure may be created for each VLAN identification number.

(5) Socket Management Table

Figure 6:
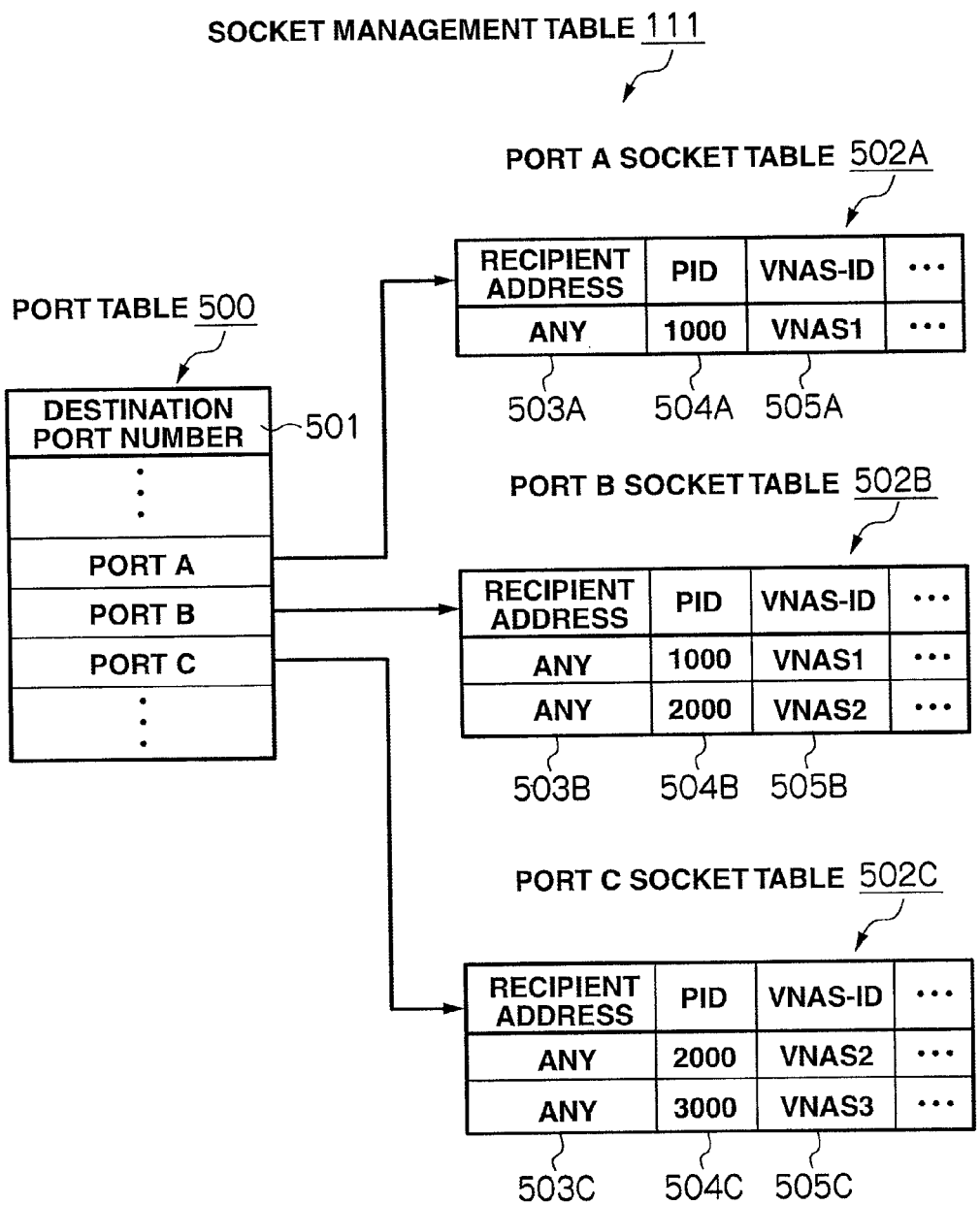
FIG. 6 is an explanatory diagram explaining a socket management table.

FIG. 6 is an explanatory diagram for explaining a socket management table 111.

The socket management table 111 is a table for managing a send/receive channel where the server application 107 expects a packet 1200; and is a table for managing the correspondence relationship of a socket, a destination port number (a second identification), and the VNAS113. Here, the socket is an endpoint consisting of a pair of an IP address and a destination port number, is arranged in each server application 107, and indicates the end point (sending/receiving channel) of a network communication path between the server application 107 and the client 101.

Moreover, the socket management table 111 consists of a port table 500, and a socket table 502 associated with the destination port numbers entered in the port table 500.

(5-1) Port Table

The port table 500 is a table for managing destination port numbers assigned in order to identify the kind of services provided by the server application 107, and includes a "destination port number" column 501. For example, among a plurality of server applications 107, server applications 107 assigned the same port numbers are the same server applications 107 providing the same services.

Specifically, the port number No. 80 is assigned to a server application 107 providing a web service, the port number No. 3020 is assigned to a server application 107 providing a CIFS service, and the port number No. 2049 is assigned to a server application 107 providing an NFS service.

Thus, the port number to be assigned is determined in correspondence with the kinds of services with which the server applications 107 provide. Therefore, the client 101 sends a request in which a destination port number is designated (the kind of services is designated) to the server machine 100.

(5-2) Socket Table

The socket table 502 is provided for each port number, and it is a table for managing sockets with the same port numbers.

The socket table 502 mainly includes a "recipient address" column 503 indicating an IP address available to receive a packet 1200, a "PID" column 504 for recording the identification number for a process generating a socket, and a "VNAS-ID" column 505 for recording the VNAS113 identification number.

The same identification number as that registered in the "VNAS-ID" column 1091 in the process management table 109 is registered in the "VNAS-ID" column 505.

Incidentally, management information such as that concerning resources used by a socket is stored in another column. Also, the socket table 502 shown in FIG. 6 is created for each port number, and they are subdivided into 502A, 502B, and 502C respectively. However, if it is not necessary to subdivide them when describing the embodiment, they will simply be described with the reference number 502. The same applies for the columns 503, 504, and 505.

Each socket can receive only a packet 1200 directed to the IP address registered in the "recipient address" column 503. However, as an exception, an ANY address indicates that it is possible to receive a packet 1200 directed to any address. A normal server application 107 is implemented so that it can receive requests (packets 1200) directed to all IP addresses in the server machine 100 by setting an ANY address as a socket.

Existing server machines cannot hold more than one socket, to which an ANY address is assigned, in socket tables associated with one and the same port number, so a plurality of the same server applications (server applications using the same port numbers) cannot be executed at one time.

In the server machine 100 in the first embodiment, it is allowed to hold more than one socket for which an ANY address is designated, so it is possible to execute a plurality of the same server applications 107 belonging to different VNASs.

Therefore, more than one socket for which an ANY address is designated is registered in a socket table 502 provided for each of the same port numbers.

The socket table 502 is used for determining, from among a plurality of sockets for which an ANY address is set as a recipient address, which socket of the server application 107 the packet 1200 from the client 101 should be delivered to.

(6) Routing Table

Figure 7:
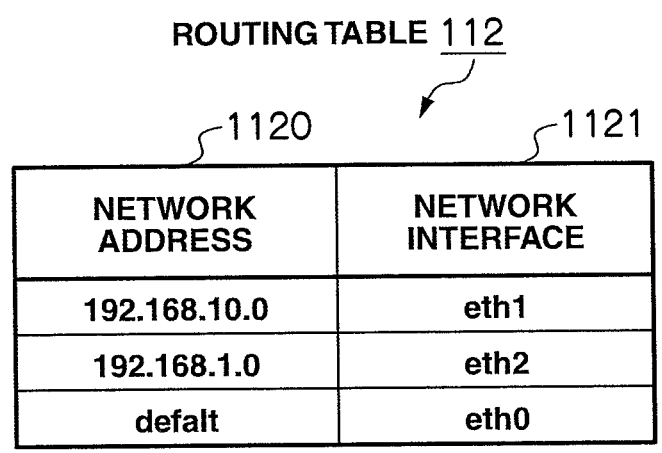
FIG. 7 is an explanatory diagram explaining a routing table.

FIG. 7 is an explanatory diagram for explaining a routing table 112.

The routing table 112 is a table for managing the network interface 103 which is available when the server machine 100 sends a packet 1200 to the client 101. The routing table 112 includes a "network address" column 1120 indicating a LAN 102 identification number and a "network interface" column 1121. For example, as shown in FIG. 7, when the server machine 100 sends a packet 1200 to the client 101 on the LAN 102 with the network address "192.168.10.0," the network interface 103 corresponding to the "eth1" is provided to be used. Incidentally, if there is no relevant network address in the table, the interface 103 corresponding to the "default" and "eth0" is used.

(7) Packet Structure

Figure 8:
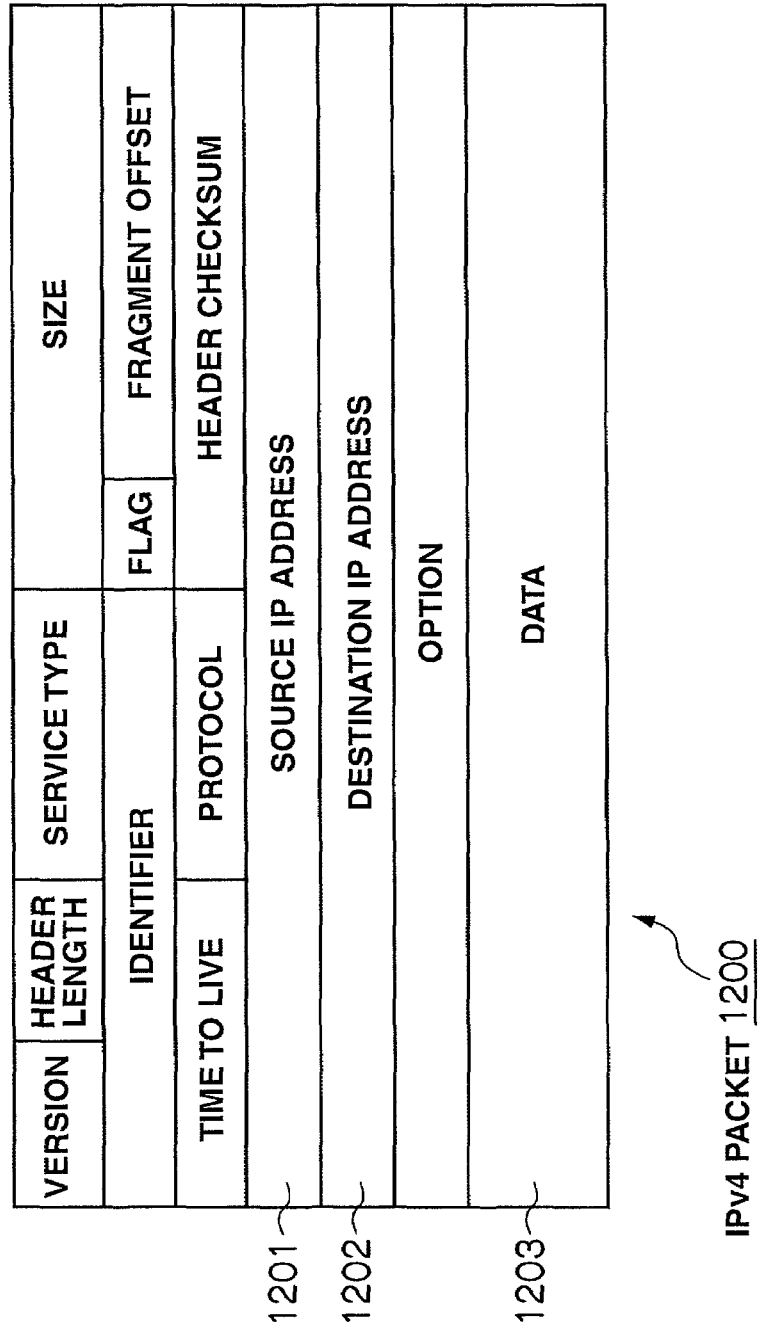
FIG. 8 is an explanatory diagram explaining the internal configuration of a packet.

FIG. 8 is a diagram showing a packet format for an IPv4 used for the communication between a server application 107 in the server machine 100 and the client 101.

A header is always added at the head of a packet 1200, and paths can be chosen in accordance with the header. In the first embodiment, when sending a packet 1200 from the client 101 to the server machine 100, the IP address of the client 101 is stored in a source address area 1201 among the specific areas of the packet 1200. The IP address of the server machine 100 is stored in a destination address area 1202. On the other hand, when returning a packet from the server machine 100 to the client 101, the stored location of the IP addresses of the server machine 100 and client machine 101 will be replaced one another. If the server machine 100 is a source/destination, the IP address of the server machine 100 is stored in a source and destination address area 1201,1202; and then data communicated by IP is stored in a data area 1203. Packet(s) of upper level protocols such as TCP or UDP is (are) stored in the data area 1203 in the first embodiment.

Figure 9:
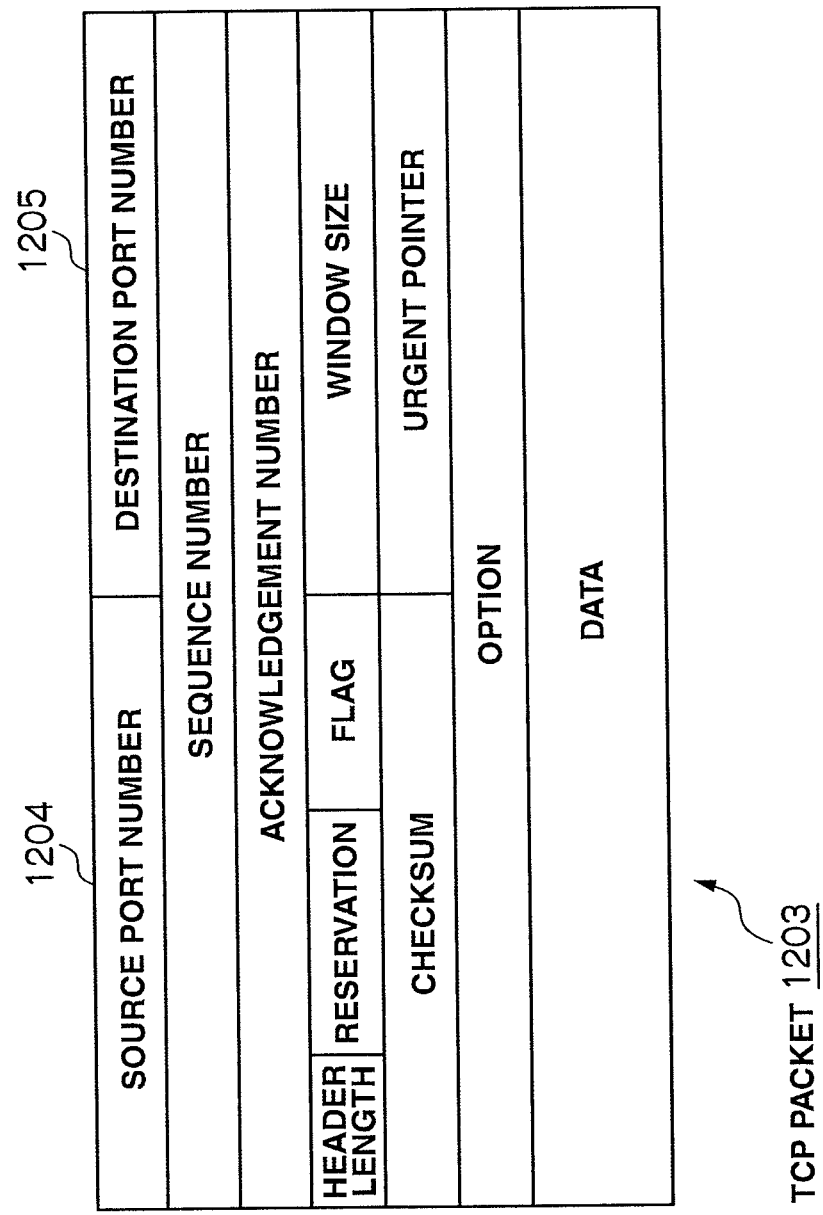
FIG. 9 is an explanatory diagram explaining the internal configuration of the data area of a packet.

FIG. 9 is a diagram showing a packet format for a network packet of the upper level protocol TCP as an example of data stored in the data area 1203 in an IPv4 packet. In the first embodiment, when sending a packet 1200 from the client 101 to the server machine 100, the port number of the client 101 is stored in a source port number area 1204 among the specific areas of the packet 1200. The port number of the server machine 100 is stored in a destination port number area 1205. On the other hand, when returning a packet from the server machine 100 to the client 101, the stored locations of the port numbers of the server machine 100 and client machine 101 will be switched with one another.

In the first embodiment, an IPv4 packet 1200 is used as a protocol for a network communication. However, it does not have to be the IPv4 packet 1200, and an IPv6 or similar protocol specification packet may be used. Furthermore, TCP is used as an upper level protocol of IPv4 in the embodiment. However, UDP or other protocols may be used as long as it includes information for determining the kind of destination service (destination port number 1205).

(8) Packet Dispatch Processing

The packet dispatch processing in which the server machine 100 dispatches packets 1200 from the client 101 to each socket will be described with reference to the above described various tables. The packet dispatch processing is executed by the CPU105 in accordance with a packet dispatching processor 202 in a packet receiving processor 201.

Figure 10:
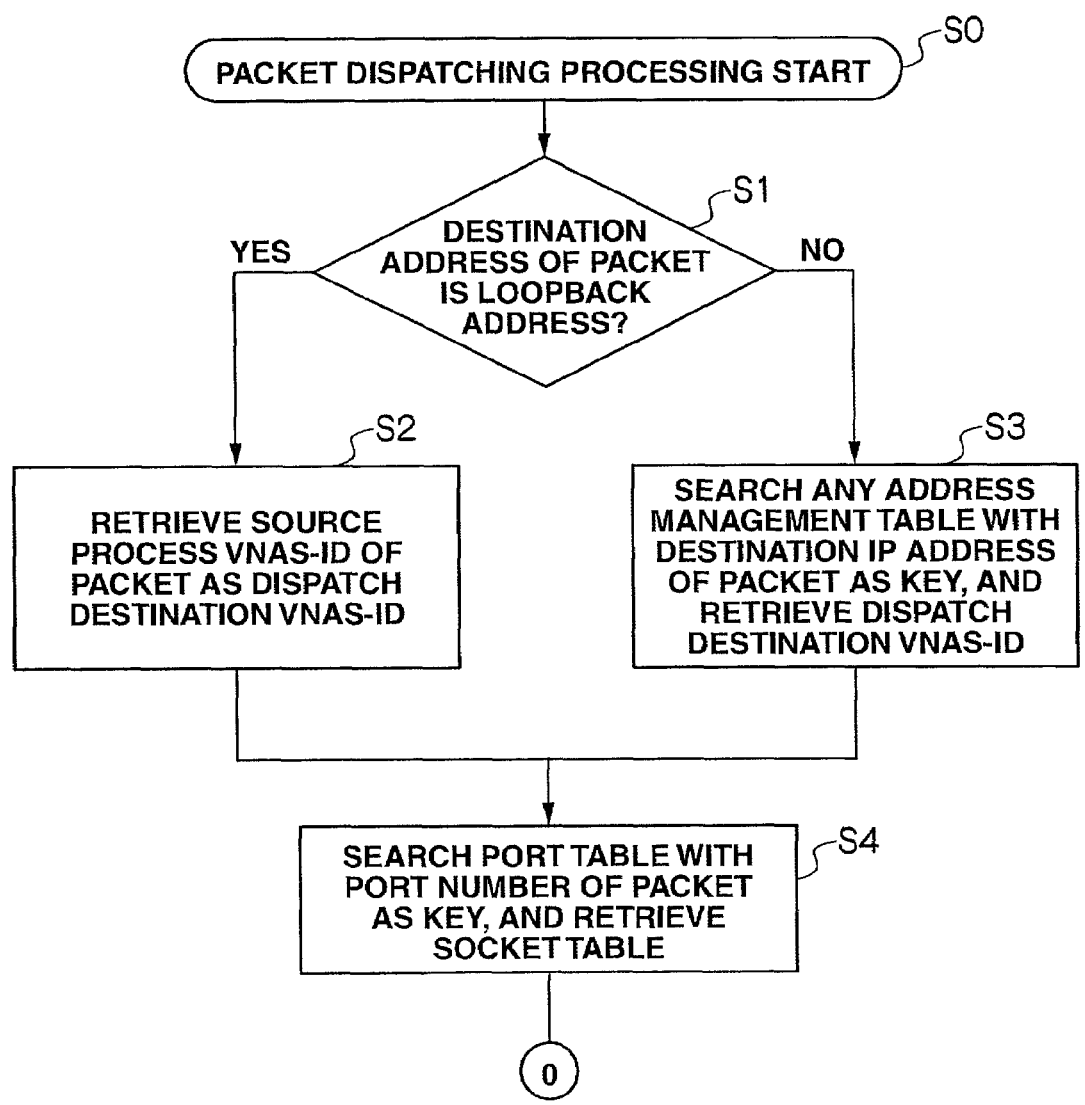
FIG. 10 is a flowchart illustrating packet dispatching processing.
Figure 11:
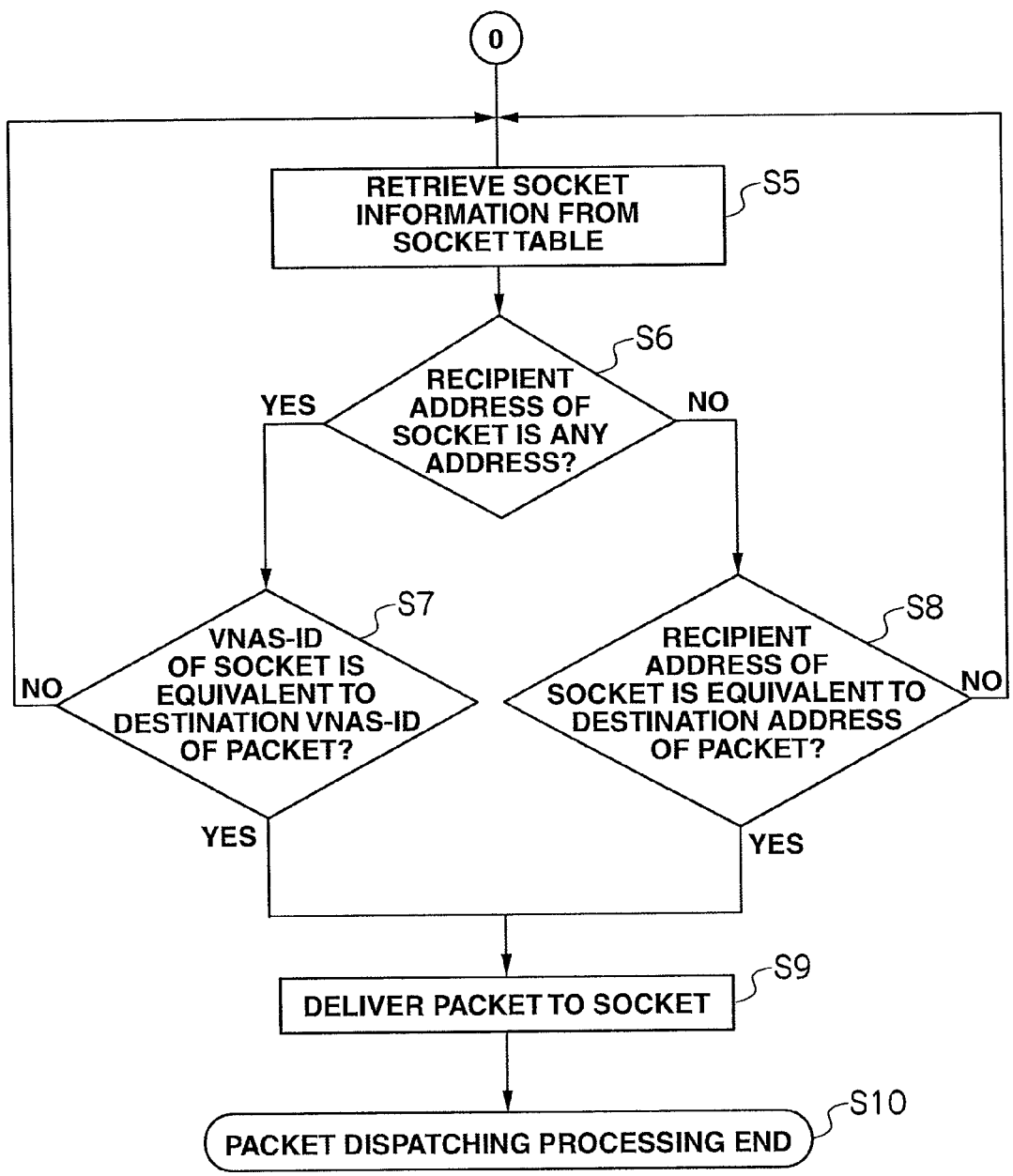
FIG. 11 is a flowchart illustrating packet dispatching processing.

Specifically, as shown in FIGS. 10 and 11, the CPU 105 starts the packet dispatch processing when a packet 1200 from the client 101 arrives at the server machine 100 (S0).

First, the CPU105 checks whether or not the destination IP address 1202 of the packet 1200 is a loopback address (S1). A loopback address is a special IP address designated in order for a process in the server machine 100 to communicate with a process (server application 107) in the same server machine 100.

If the destination IP address 1202 of the packet 1200 is a loopback address (S1: YES), the CPU105 retrieves the identification number of the VNAS113 to which the source process of the packet 1200 belongs as the dispatch destination VNAS113 identification number (S2). In that case, the CPU105 cannot identify which VNAS113 the communication was directed to by using the destination IP address 1202 of the packet 1200 as a key, because the destination IP address 1202 is a loopback address. Therefore, the CPU105 dispatches packets to sockets with the same VNAS113 identification number as that of the packet source process.

Meanwhile, if the destination IP address 1202 of the packet 1200 is not a loopback address (S1: NO), the CPU105 refers to the ANY address management table 110 by using the destination IP address 1202 of the packet 1200 as a key, and retrieves the VNAS113 identification number associated with the destination IP address 1202 as a dispatch destination VNAS113 identification number (S3).

When the dispatch destination VNAS113 identification number is determined, the CPU105 looks for the destination port number 1205 by using the destination port number 1205 of a packet as a key and with reference to the port table 500. And after the CPU105 looks for the destination port number 1205, it retrieves a socket table 502 associated with the aforementioned port number (S4).

The CPU105 retrieves socket information in the order of being registered in the socket table 502 (S5), and then the CPU 105 judges whether or not the recipient address of the socket is registered as an ANY address (S6).

If the CPU105 judges that the socket is registered as an ANY address (S6: YES), it goes on to judge whether or not the VNAS113 identification number in the socket table 502 and the dispatch destination VNAS113 identification number for the packet are equivalent to one another (S7).

If the CPU105 judges that they are not equivalent to one another (S7: NO), the CPU 105 retrieves the next piece of socket information registered in the socket table 502 (S5), and then executes the processing in step S6.

If the CPU105 judges that they are equivalent to one another (S7: YES), the CPU 105 delivers the packet 1200 to the socket judged as being equivalent (S9), and then terminates the packet dispatch processing (S10).

Meanwhile, in step S6, if the CPU105 judges that the recipient address of the socket is not registered as an ANY address (S6: NO), it judges whether or not the recipient address of the socket and the destination IP address 1202 of the packet 1200 are equivalent to one another (S8).

If the CPU105 judges that they are not equivalent to one another (S8: NO), the CPU 105 retrieves the next piece of socket information registered in the socket table 502 (S5) and then executes the processing in step S6.

If the CPU105 judges that they are equivalent to one another (S8: YES), the CPU 105 delivers the packet 1200 to the socket judged as being equivalent (S9), and then terminates the packet dispatch processing (S10).

According to the above described flow chart, a packet received from a process in the client 101 or the server machine 100 is dispatched to a server application 107 with particular VNAS113 identification number based on the destination IP address 1202 and the VNAS113 identification number.

(9) Source Address Setting Processing

Next, the source address setting processing for setting source addresses when a process (server application 107) receives a request from the client 101 or the server machine 100 replies will be described. The source address setting processing is executed by the CPU105 in accordance with a source address setting processor 204.

Figure 12:
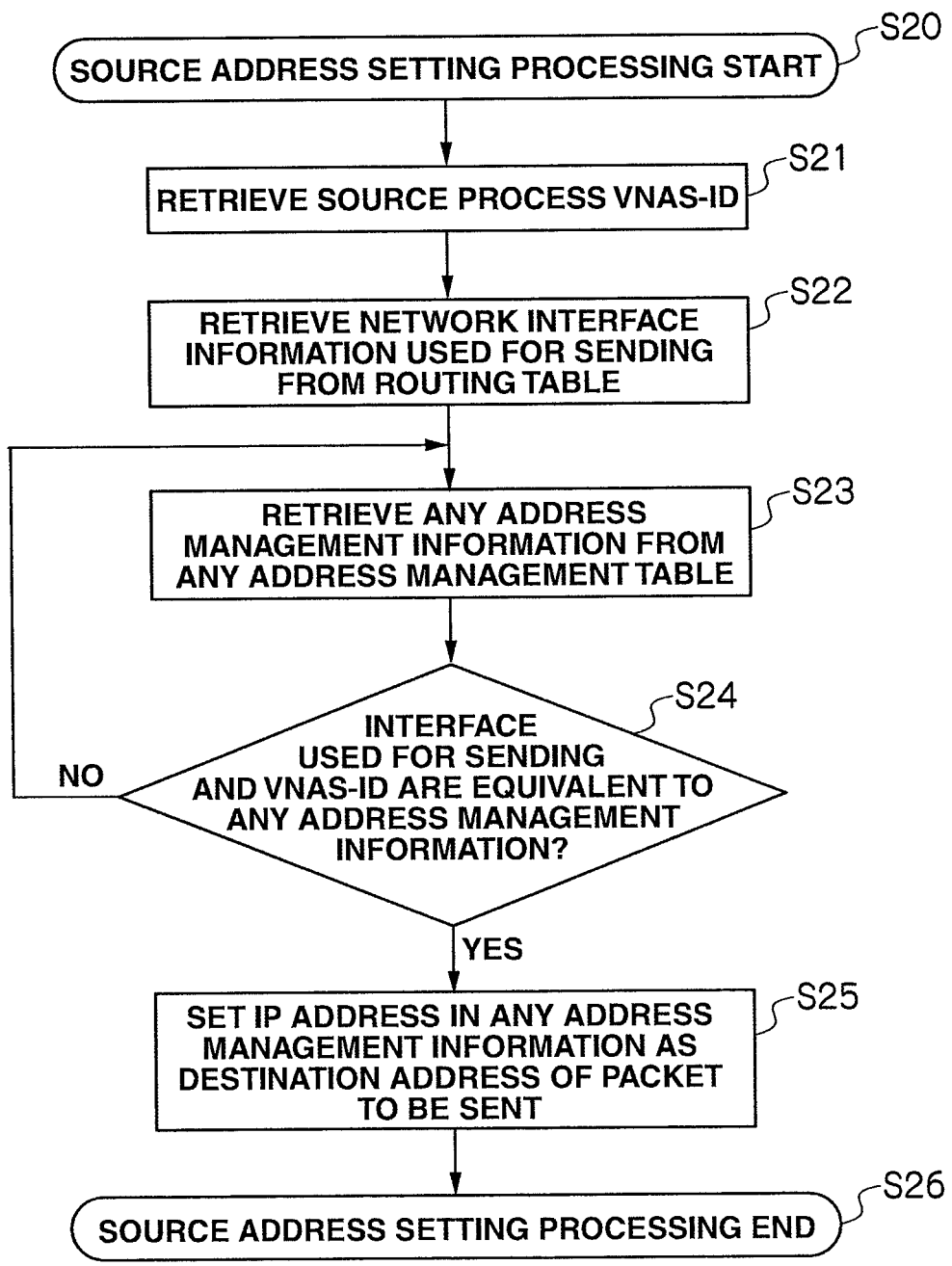
FIG. 12 is a flowchart illustrating source address setting processing.

As shown in FIG. 12, the CPU105 starts the source address setting processing when a dispatched process (server application 107) replies to a request from the client 101 or the server machine 100 (S20).

The CPU 105 retrieves the VNAS113 identification number for the source process (server application 107) of a packet 1200 from the process management table 109 (S21).

Next, the CPU105 refers to a routing table 112, and retrieves information on the network interface 103 used for returning a packet 1200 in response to a request from the client 101 or the server machine 100 (S22).

The CPU105 retrieves ANY address management information INFO from the ANY address management table 110 (S23).

The CPU105 then judges whether or not the VNAS113 identification number retrieved in step S21 and the network interface 103 retrieved in step S22 are respectively equivalent to the VNAS113 identification number and the network interface 103 in ANY address management information INFO (S24).

If the CPU 105 judges that they are not equivalent (S24: NO), it returns to step S23, retrieves a next ANY address management information INFO, and executes the processing in step S24.

Meanwhile, if the CPU105 judges that they are equivalent (S24: YES), the CPU 105 sets the IP address of the ANY address management information INFO to the source address of the packet 1200 to be sent (S25), and then terminates the source address setting processing (S26).

According to the above described flow chart, the CPU105 can set the source IP address 1201 of a packet 1200 based on the identification number of the VNAS113 to which the source server application 107 belongs.

(10) Interface Validation Processing

Next, the interface validation processing for enabling the network interface 103 by adding an IP address will be described. The interface validation processing is executed by the CPU105 in accordance with the interface validation processor 206.

Figure 13:
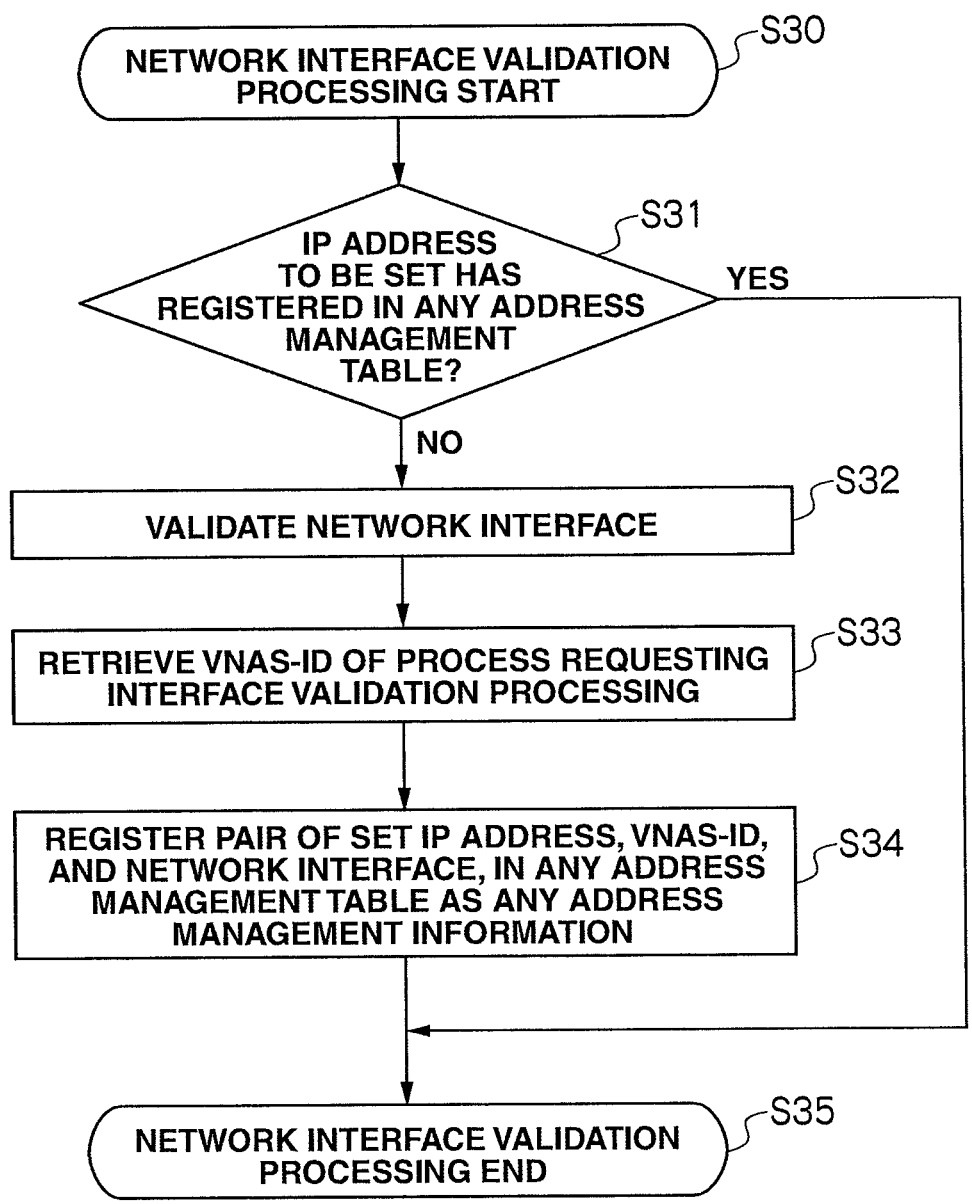
FIG. 13 is a flowchart illustrating network interface validation processing.

As shown in FIG. 13, the CPU105 starts the interface validation processing when the process in the network interface setting program 114 is generated and an IP address setting is requested (S30).

The CPU105 judges whether or not an IP address to be added to the network interface 103 has been registered in the ANY address management table 110 (S31).

If the IP address is not yet registered (S31: NO), the CPU105 enables the network interface 103 by adding an IP address to the network interface 103 (S32).

Next, the CPU105 retrieves the identification number of a VNAS to which a process requesting the interface validation processing belongs from the process management table 109 (S33). Here, the process requesting the interface validation processing indicates a process in the interface setting program 114.

After the CPU105 registers the pair of: the set IP address; the identification number of the VNAS113 to which the process requesting the interface validation processing belongs; and the network interface 103 to which the IP address is added, as ANY address management information INFO, in the ANY address management table 110 (S34), the CPU 105 then terminates the interface validation processing (S35).

Incidentally, in step S31, if the IP address has been registered (S31: YES), the CPU105 terminates the interface validation processing (S35).

According to the above described flow chart, the network interface 103 is validated and enabled. At the same time, the IP address set for the network interface 103 becomes available for a process family belonging to the same VNAS113 as that to which the process requesting the interface validation processing belongs.

(11) Interface Invalidation Processing

Next, the interface invalidation processing for disabling a network interface 103, by deleting the IP address added to the network interface 103 when stopping all process families belonging to the same VNAS113, will be described. The interface invalidation processing is executed by the CPU105 in accordance with the interface invalidation processor 207.

Figure 14:
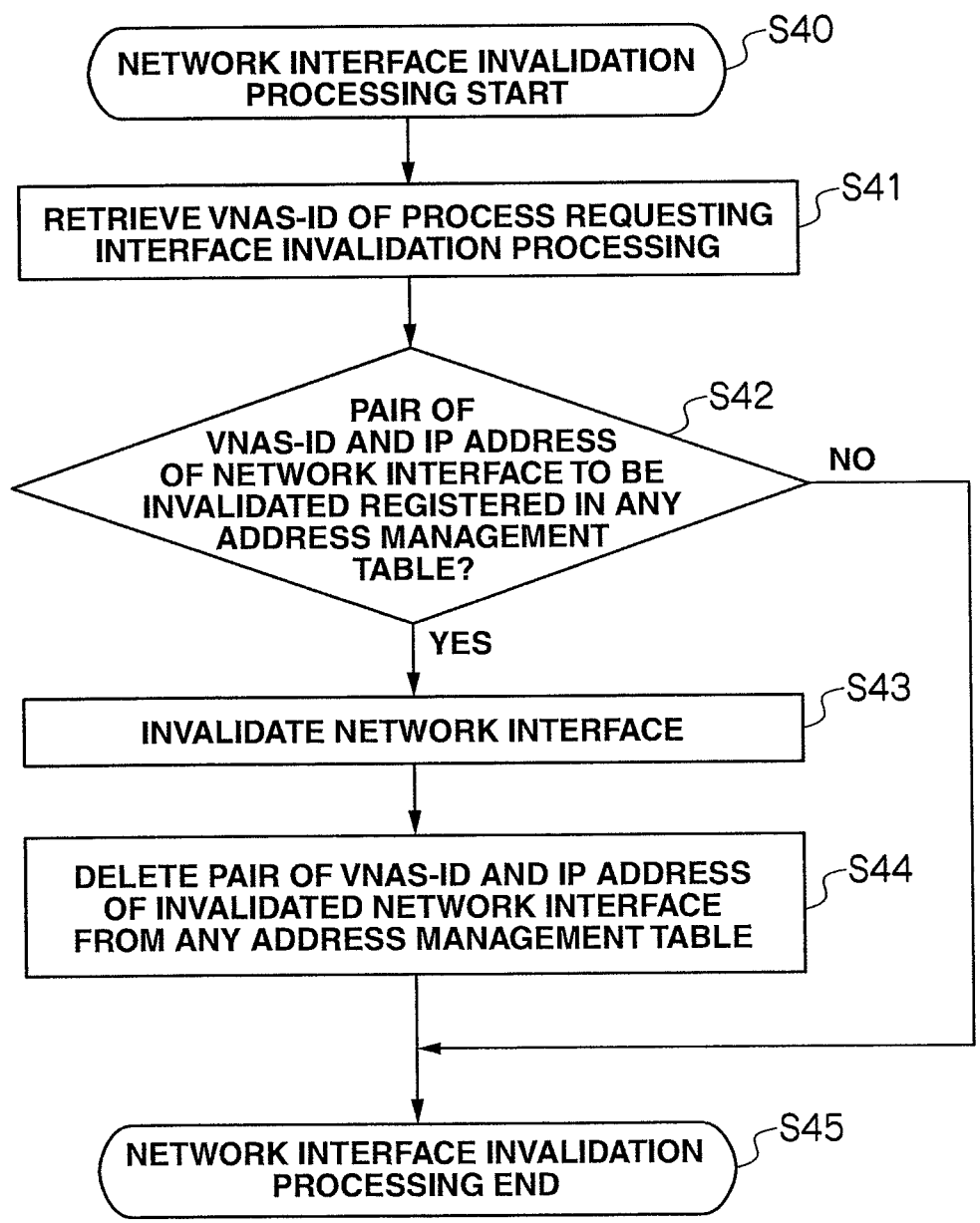
FIG. 14 is a flowchart illustrating network interface invalidation processing.

As shown in FIG. 14, the CPU105 starts the interface invalidation processing when the process in the network interface setting program 114 is generated and an IP address deletion is requested (S40).

First, the CPU105 retrieves the identification number of the VNAS113 to which a process requesting the interface invalidation processing belongs from the process management table 109 (S41). The CPU105 judges whether or not a pair of an IP address added to the network interface 103 to be invalidated and a VNAS113 identification number has been registered in the ANY address management table 110 (S42).

If a pair has been registered (S42: YES), the CPU105 disables the network interface 103 by detaching the IP address added to the network interface 103 (S43).

The CPU105 deletes the set of: the IP address of the invalidated network interface 103; a VNAS113 identification number; and the network interface 103 to which an IP address is added, from the ANY address management table 110 (S44), and then terminates the interface invalidation processing (S45).

Incidentally, in step S42, if the pair is not yet registered (S42: NO), the CPU105 terminates the interface invalidation processing (S45).

According to the above described flow chart, the network interface 103 is invalidated and disabled. At the same time, the IP address set for the network interface 103 becomes unavailable for a process family belonging to the same VNAS113 as that to which the process requesting the interface invalidation processing belongs.

(12) Other ANY Address Management Tables

Figure 15:
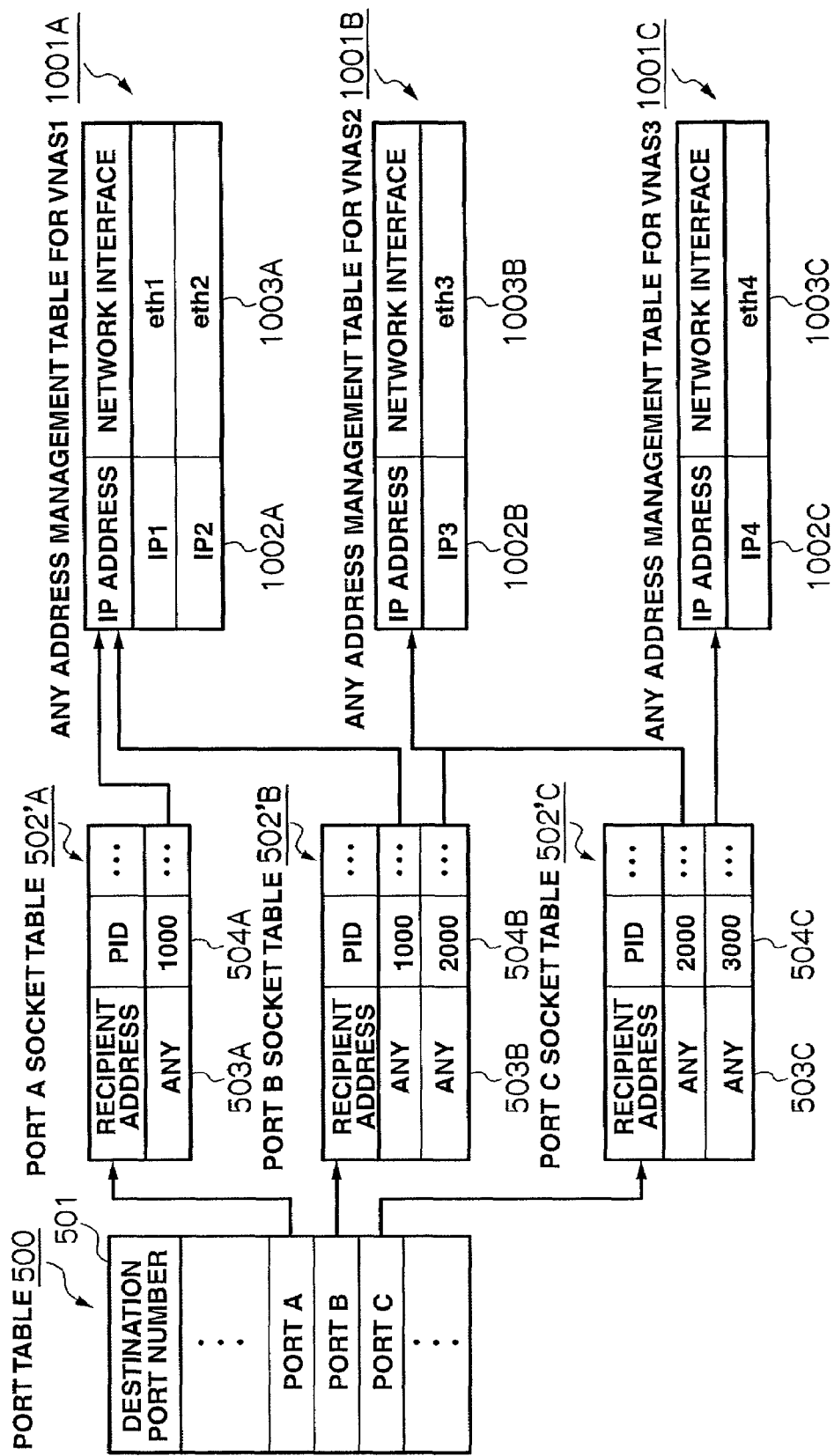
FIG. 15 is an explanatory diagram explaining another aspect of an ANY address management table.

As shown in FIG. 15, ANY address management tables 1001A-1001C may be created for each VNAS113.

In that case, the ANY address management tables 1001A-1001C include an "IP address" column 1002A-1002C and a "network interface" column 1003A-1003C. The respective columns 1002, 1003 have features similar to those of the respective columns 1100, 1102 described with reference to FIG. 5.

Furthermore, item columns in a socket management table 502' created for each port mainly include a "recipient address" column 503 and a "PID" column 504. Thus, a IP address available to receive a packet 1200 may be held in other ANY address management table 1001 as a table, and the IP address may be associated with a VNAS113.

(13) Advantageous Effects of the Embodiment

According to the embodiment, it is possible to run a plurality of same server applications expecting requests by using an ANY address on a single OS in one server machine.

Also, one server machine can recognize requests from a client and dispatch the requests without fail even when there is more than one same server application.

The same services operated on a plurality of server machines can be consolidated onto a single server machine without modifying an existing server application, and the one server machine can be used as a server consolidation.

The present invention can be broadly applied in a computer system including one or more server machines, or other types of computer systems.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A server, comprising:
   a plurality of network interfaces coupled to a client computer through a network, the network interface receiving and sending IP packets, different IP addresses being assigned to the network interfaces;
   a processor being configured to execute: an operating system, a plurality of first applications running on the operating system when a first port number is assigned, and a plurality of second applications running on the operating system when a second port number is assigned;
   a memory unit storing: the operating system, the first and second applications, first information for managing correspondence between the IP addresses assigned to the network interfaces and process group identifiers so that one of the process group identifiers is uniquely defined for each of the IP addresses, and
   second information for managing a plurality of first sockets with respect to the first port number and a plurality of second sockets with respect to the second port number; the first and second sockets being capable of receiving IP packets where their source IP addresses are any of the IP addresses;
   wherein the processor is configured to: create a plurality of first processes for establishing the first sockets, assign different ones of the process group identifiers to the first processes, create a plurality of second processes for establishing the second sockets, assign different ones of the process group identifiers to the second processes, and
   register correspondence between the first sockets and the assigned process group identifiers and correspondence between the second sockets and the assigned process group identifiers with the second information;
   wherein the processor is configured, upon receipt of an IP packet from the client computer requesting service designated by either one of the first port number or the second port number at one of the network interfaces, to: retrieve the process group identifier corresponding to the network interface from the first information, retrieve one of the first and second sockets from the second information by both the designated port number and the process group identifier retrieved from the first information, and send the IP packet to the retrieved socket.

2. A server according to claim 1, wherein the processor is configured to, upon receipt of a request for validating a network interface, to:
   assign an IP address to the network interface,
   assign one of the process group identifiers associated with the network interface, and
   register the correspondence between the IP address assigned to the network interface and the one of the process group identifier with the first information.

3. A server according to claim 1, wherein the processor is configured to, upon receipt of a request for invalidating a network interface, to:
   remove the IP address assigned to the network interface from the network interface, and
   delete the correspondence between the IP address assigned to the network interface and the process group identifier from the first information.

4. A method, comprising:
   providing first information for managing correspondence between IP addresses assigned to a server and process group identifiers so that one of the process group identifiers is uniquely defined for each of the IP addresses,
   creating a plurality of first processes for establishing a plurality of first sockets with respect to a first port number and a plurality of second processes for establishing a plurality of second sockets with respect to a second port number;
   the first port number being assigned to a plurality of first applications running on an operating system, the second port number being assigned to a plurality of second applications running on the operating system, the first and second sockets being capable of receiving IP packets where their source IP addresses are any of IP addresses assigned to the server;
   assigning different one of the process group identifiers to the first processes, assigning different one of the process group identifiers to the second processes, providing second information for managing the first and second sockets, and registering correspondence between the first sockets and the assigned process group identifiers and correspondence between the second sockets and the assigned process group identifiers with the second information;
   receiving an IP packet from a client computer requesting service designated by either one of the first port number or the second port number;
   retrieving the process group identifier corresponding to an IP address where the IP packet is received from the first information;
   retrieving one of the first and second sockets from the second information by both the designated port number and the process group identifier retrieved from the first information; and
   sending the IP packet to the retrieved socket.

5. A method according to claim 4, further comprising:
   receiving a request for validating a network interface associated with the server;
      assigning an IP address to the network interface;
      assigning one of the process group identifiers associated with the network interface; and
      registering the correspondence between the IP address assigned to the network interface and the one of the process group identifier with the first information.

6. A method according to claim 2, further comprising:
   receiving a request for invalidating a network interface associated with the server;
      removing an IP address assigned to the network interface from the network interface; and
      deleting the correspondence between the IP address assigned to the network interface and the process group identifier from the first information.

* * * * *